Figure 1:
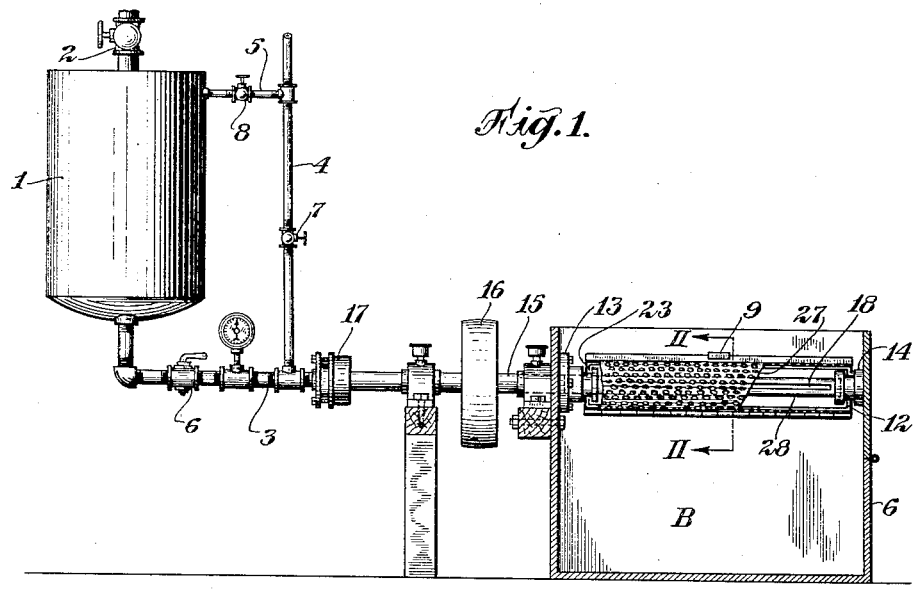

Feb. 14, 1933.　　　　W. R. SEIGLE　　　　1,897,401
CENTRIFUGAL MOLDING DEVICE
Filed Feb. 27, 1931　　　2 Sheets-Sheet 1

INVENTOR.
William R. Seigle.
BY D. N. Halstead
ATTORNEY.

Feb. 14, 1933.    W. R. SEIGLE    1,897,401
CENTRIFUGAL MOLDING DEVICE
Filed Feb. 27, 1931    2 Sheets-Sheet 2

INVENTOR.
William R. Seigle.
BY D. N. Halstead
ATTORNEY.

Patented Feb. 14, 1933

1,897,401

UNITED STATES PATENT OFFICE

WILLIAM R. SEIGLE, OF MAMARONECK, NEW YORK, ASSIGNOR TO JOHNS-MANVILLE CORPORATION, OF NEW YORK, N. Y., A CORPORATION OF NEW YORK

CENTRIFUGAL MOLDING DEVICE

Application filed February 27, 1931. Serial No. 518,640.

The present invention relates to an improved device for centrifugally molding tubular products such as heat insulating pipe covering.

Various devices for this purpose have been proposed heretofore as for example the device illustrated in U. S. patent to Johns #464,218. However, none of these devices have proven practicable commercially or adapted to produce a commercially acceptable product. The structure shown in the Johns patent includes a rotatable hollow cylinder having a large number of small perforations thru which the stock is distributed. This arrangement has been found to be ineffective since it results in either a stoppage of the flow of the stock due to clogging of the apertures, or if these are made larger, the inner surface of the formed tube is of a very uneven and pitted texture thereby rendering a trimming operation imperative. A further disadvantage of the Johns structure is the necessity of revolving both the distributing mandrel and the outer perforated shell during the molding operation.

The general object of this invention is the provision of a device of the character described free from the disadvantages which characterize the Johns and other similar devices.

A specific object of the invention is the provision of a distributing mandrel which rapidly and effectively distributes the stock, and forms a tubular article having a smooth inner surface thereby eliminating the necessity for trimming.

A further object is the provision of a distributing mandrel devised so that the amount of stock remaining therein at the end of any single molding operation will be reduced to the minimum, thereby greatly reducing the amount of pulp circulated, and rendering possible the economical production of large bore pipe sections.

A still further object is the reduction of the mass and number of rotated parts to a minimum whereby simplicity and economy of operation is attained.

The device provided by my invention comprises a perforated or foraminous tubular shell having inner dimensions corresponding to the outer dimensions of the desired tubular product. A hollow mandrel approximately cylindrical in shape and of a diameter approximately the same as the bore of the desired tubular product is rotatably mounted in the shell. An aperture preferably an elongated slot is provided in the mandrel for the passage of stock therefrom into the space enclosed between it and the outer shell and one of the marginal edges of the aperture is preferably curved inwardly for a purpose explained hereinafter. The outer shell and rotating mandrel are assembled in such a manner that they may be readily separated and reassembled to permit the removal of the tubular product. Additional features and advantage of my invention will be apparent from the following description of an illustrative embodiment taken in connection with the drawings in which;

Fig. I is an assembly of the device including means for feeding stock thereto.

Fig. II is a sectional view along line (2—2) and illustrates in detail the construction of the distributing mandrel.

Figs. III to VII are views similar to Fig. II of modified forms of distributing mandrels.

In the drawings, a storage tank for the stock or pulp is indicated by numeral 1. Tank 1 is provided with a suitable valved inlet pipe 2 for the admission of stock thereto and a valved stock outlet pipe 3 leading to the centrifugal molding device indicated generally by B. A fluid pressure pipe 4 for the passage of steam or other suitable fluid medium such as air is connected to the stock outlet pipe 3 and a branch pipe 5 leads therefrom to the top of tank 1. Pipes 3, 4, and 5 are provided respectively with valves 6, 7 and 8 which may be regulated so that stock alone, or steam alone may be conducted thru pipe 3 to the molding device.

The centrifugal molding device B is mounted in a suitable receptacle 6 which serves to collect the water separated during the molding operation. The molding means comprises a perforated tubular shell 27 and a hollow mandrel 28 rotatably mounted in the center of shell 27. The outer dimensions of mandrel 28 and the inner dimensions of shell 27 are such that the space enclosed therebetween is of substantially the same volume and configuration as that of the desired tubular product. Shell 27 is preferably secured in a stationary position by any suitable fastening means as for example, a brace 9 attached at one end to the top of the shell and at the other end to the side of receptacle 6. Shell 27 may be formed of any type of suitable material such as metal. As shown, it includes two segments of perforated sheet metal semicircular in section and secured together by hinge 10 and a readily removable clamp 11. A filtering medium such as a fine meshed wire cloth 12 is preferably disposed over the inner surface of the segments. The ends of the shell are turned inwardly to form circular flanges 23 which fit into circular grooves in bearings 13 and 14.

The mandrel 28 is rotatably mounted in bearings 13 and 14 and keyed to the hollow driving shaft 15 which is rotated by pulley 16 or other suitable means. Shaft 15 is connected to pipe 3 by an appropriate form of bearing or stuffing box 17 so that stock may flow from tank 1 into the interior of mandrel 28. An elongated slot 18 is provided in the mandrel for the purpose of permitting the flow of stock from the interior of the mandrel into the space enclosed by it and the outer shell. The form of this slot and the configuration of the outer surface of the mandrel has been ascertained to be highly important in the production of a satisfactory product and the most effective results may be secured by constructing the mandrel as indicated in views 2 to 7. In these views the circumference of the molded product is indicated by a dotted circle which is tangential to the mandrel at its high point or points.

Figure 7:
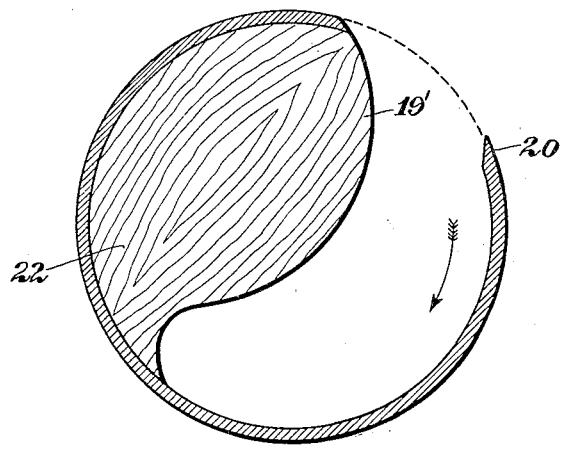

In the form of mandrel shown in these views the marginal edge of the slot 19 located rearwardly with respect to the direction of rotation is curved inwardly so that this edge is substantially nearer the center than the edge 20. The inwardly extending edge need not be an intergal part of the outer casing of the mandrel but may be formed by a filling strip having the curved edge 19' as indicated in Fig. 7. This construction has the advantage of producing a product having a smooth inner surface whereas if these edges are disposed the same distance from the center, a rough pitted surface is produced. The objectionable effect resulting from the use of the latter construction may be attributed to the accumulation of masses of stock on the edge located rearwardly of the direction of rotation. These accumulations prevent the stock from being evenly and uniformly distributed and roughen the surface of the stock initially distributed.

Figure 2:
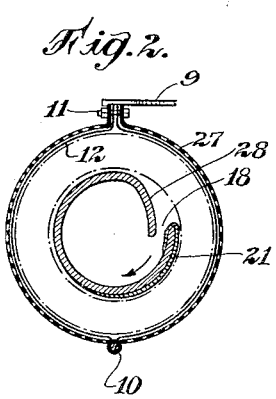
Figure 3:
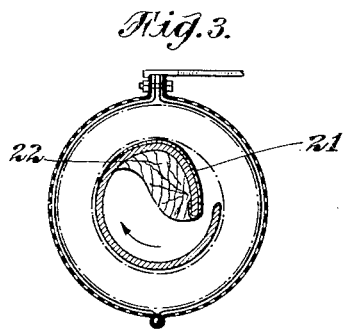
Figure 4:
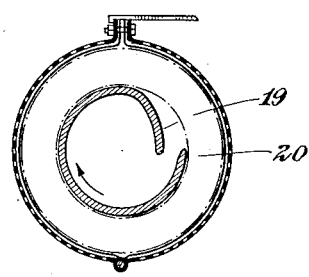

The mandrel is preferably of a generally cylindrical shape but a limited segment of its peripheral surface is preferably made of a diameter slightly larger than its average diameter. In the event that the surface of the mandrel is perfectly cylindrical the molded product may be removed from the mandrel due to the amount of their surfaces which are in close adhering contact only by the exertion upon the product of a relatively great force which causes frequent breakage. The desired form of surface may be constructed readily by employing cylindrical tubing for the main body of the mandrel and welding a thin metal plate 21 on to a limited segment of its surface adjacent the distributing slot as shown in Figs. 2 and 3. The plate 21 is preferably disposed on the edge portion opposite to the inwardly bent edge as indicated in Fig. II and given a slight taper so that the peripheral surface of the mandrel is slightly helical and has the segment of widest diameter located in a forward position with respect to the direction of rotation. The incline face of the mandrel thus places a progressively increasing pressure during a single revolution on stock forced thru slot 18. By providing the mandrel with a cam-like segment such as plate 21, the molded product is provided with a cylindrical bore having a greater over-all diameter than the maximum diameter of the mandrel and is therefore readily removable. Obviously the segment 21 may form an integral part of the mandrel if desired.

Figure 5:
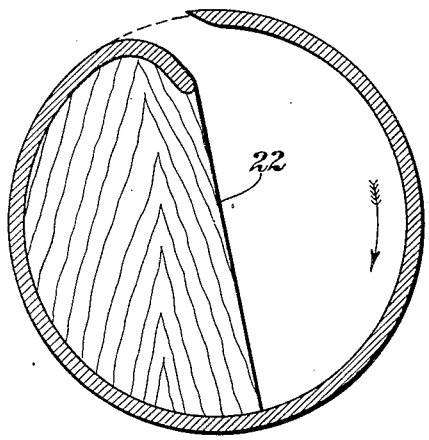
Figure 6:
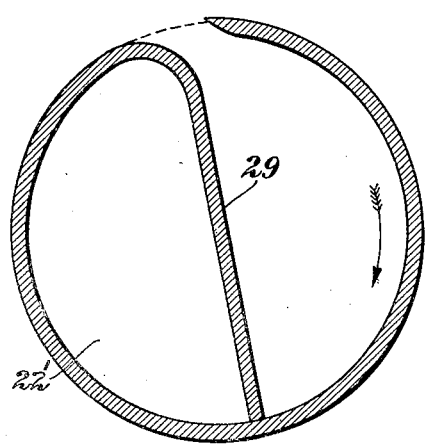

In certain instances particularly when large bore tubular products are to be manufactured, it is desirable to provide the mandrel with an inner partition wall or a relatively thick side wall structure or filling strip 22 such as is shown in Figs. 3 and 5 to 7 inclusive so as to reduce the section of the longitudinal passageway thru the mandrel to an area not substantially in excess of that required to conduct the requisite quantity of stock for the molding operation. A large excess of stock in the molding mandrel at the end of the molding operation is thereby avoided. The presence of a large excess is objectionable since it must either be drained or forced thru slot 18 by fluid pressure thereby rendering the inner surface of the product unduly dense and hard and its removal from the mandrel very difficult. The thick side wall structure may be provided in various ways as for instance either by the use of a filling strip 22 as indicated in Figs. 3, 5 and 7 or by forming a closed cell 22' in the mandrel by means of a wall 29 as indicated in Fig. 6.

In operating the apparatus tank 1 is first filled with a suitable pulp solution such as a mixture in water of asbestos fibers and magnesium carbonate. Mandrel 28 is set into rotation and stock from the tank forced thereto thru pipe 3 by fluid pressure applied at the top of the tank, valves 6 and 8 being open and valve 7 closed at this stage. The amount of pressure applied is regulated in accordance with the reading of the pressure gauge attached to pipe 3 and will vary slightly with different materials. The rotation of the mandrel throws the stock against the side wall of the shell and the major part of its water content is separated thru the small filtering perforations in the shell. Stock is permitted to flow into the mandrel until the flow of water from the perforations substantially stops which indicates that the space between the mandrel and shell is filled with the solid content of the pulp. Valves 6 and 8 are then closed and valve 7 open thereby forcing steam thru pipe 3 and the molded product thereby removing the residual water in the product. The rotation of the mandrel is then stopped and the shell unclamped and removed, and bearing 14 slid or swung out of connection with the mandrel. The molded product may then be readily slid off the open end of the mandrel and is thereafter dried.

The products molded by this device have been found to be especially advantageous for pipe covering employed for heat insulating since the product may be molded to size and no trimming of the surface with its incident waste of material is necessary, and the construction of the device is such that rapid and economical production is obtained. The product although very light is exceptionally strong as the fibers in the pulp are drawn out in the direction of rotation of the mandrel during the molding operation. Consequently they are circumferentially disposed in the product and in this position exert the maximum resistance to mechanical stresses.

The pulp employed may vary widely in composition and a wide range of compositions have been utilized successfully including mixtures with water in various combinations and proportions of mineral wool, cut sponge, magnesium carbonate, asbestos fibers, paper pulp, rag stock, with and without binding materials such as starch, silicate of soda, water soluble asphalt and casein.

What I claim is:

1. In a device for centrifugally molding tubular shaped products, the combination of a perforated shell having inner dimensions corresponding to the outer dimensions of the desired tubular product, a rotatable hollow mandrel centrally mounted in said shell and provided with an aperture for the passage of stock therefrom into the space enclosed between the shell and mandrel, one of the marginal edges of said aperture being curved inwardly.

2. In a device for centrifugally molding tubular shaped products, the combination of a perforated shell having inner dimensions corresponding to the outer dimensions of the desired tubular product, a rotatable hollow mandrel centrally mounted in said shell and provided with an elongated slot for the passage of stock therefrom into the space enclosed between the shell and mandrel, one of the longitudinal marginal edges of said elongated slot being curved inwardly.

3. In a device for centrifugally molding tubular shaped products, the combination of a perforated shell having inner dimensions corresponding to the outer dimensions of the desired tubular product, a rotatable hollow mandrel centrally mounted in said shell and provided with an elongated slot substantially parallel to the axis of the mandrel for the passage of stock therefrom into the space enclosed between the shell and mandrel, one of the longitudinal marginal edges of said elongated slot being curved inwardly.

4. In a device for centrifugally molding tubular shaped products, the combination of a stationary perforated shell having inner dimensions corresponding to the outer dimensions of the desired tubular product, a rotatable hollow mandrel centrally mounted in said stationary perforated shell and provided with an elongated slot for the passage of stock therefrom into the space enclosed between the shell and mandrel, one of the longitudinal marginal edges of said aperture being curved inwardly.

5. In a device for centrifugally molding tubular shaped products, the combination of a perforated shell having inner dimensions corresponding to the outer dimensions of the desired tubular product, a rotatable hollow mandrel of a diameter approximately the same as the bore of the desired tubular product centrally mounted in said shell and provided with an aperture for the passage of stock therefrom into the space enclosed between the shell and mandrel, the peripheral surface of said mandrel being substantially cylindrical but including a segment of slightly greater diameter than the average diameter of said surface.

6. In a device for centrifugally molding tubular shaped products, the combination of a perforated shell having inner dimensions corresponding to the outer dimensions of the desired tubular product, a rotatable hollow mandrel of a diameter approximately the same as the bore of the desired tubular product centrally mounted in said shell and provided with an elongated slot for the passage of stock therefrom into the space enclosed between the shell and mandrel, the periphery of said mandrel being substantially circular in cross-section but having a segment adjacent said slot of slightly greater diameter than the average diameter of said periphery.

7. In a device for centrifugally molding tubular shaped products, the combination of a perforated shall having inner dimensions corresponding to the outer dimensions of the desired tubular product, a rotatable hollow mandrel centrally counted in said shell and provided with an elongated slot for the passage of stock therefrom into the space enclosed between the shell and mandrel, the periphery of said mandrel being slightly helical in cross-section and having the segment thereof of greatest diameter adjacent said slot.

8. In a device for centrifugally molding tubular shaped products, the combination of a perforated shell having inner dimensions corresponding to the outer dimensions of the desired tubular product, a hollow rotatable mandrel of approximately the same diameter as the inner diameter of the desired tubular object centrally mounted in said shell, said mandrel being provided with an elongated slot for the passage of stock therefrom into the space enclosed between the shell and mandrel and with an inner partition wall so disposed that the dimensions of the longitudinal passageway thru the mandrel are not substantially in excess of that required to provide the required rate of flow thru the slot.

9. In a device for centrifugally molding tubular shaped products, the combination of a perforated shell having inner dimensions corresponding to the outer dimensions of the desired tubular product, a hollow rotatable mandrel of the same diameter as the inner diameter of the desired tubular object centrally mounted in said shell and provided with an aperture for the passage of stock therefrom into the space enclosed between the shell and mandrel, and a filling strip disposed within the hollow space in the mandrel and sufficiently large to substantially reduce the size of the longitudinal passageway thru the mandrel and the amount of stock left therein when the supply of stock thereto is cut off.

Signed at New York in the county of New York and State of New York this 26th day of February A. D. 1931.

WILLIAM R. SEIGLE.